Patented Feb. 1, 1949

2,460,300

UNITED STATES PATENT OFFICE 2,460,300

POLYMERIC PRODUCTS DERIVED FROM DI-OLEFINS AND VINYL AROMATIC COMPOUNDS AND METHOD OF MAKING SAME

Walter J. Le Fevre and Kenneth G. Harding, Midland, Mich., assignors to The Dow Chemical Company, Midland, Mich., a corporation of Delaware No Drawing. Application June 29, 1944, Serial No. 542,818

18 Claims. (Cl. 260—86.5)

This invention concerns certain new polymeric products which possess an unusual combination of properties. It also concerns a method of making such products.

The new products consist essentially of polymers of a conjugated aliphatic diolefine and a monovinyl aromatic compound in amounts corresponding to between 37.5 and 94.5 mole per cent of the diolefine, based on the total amount of the diolefine and the vinyl aromatic compound used in preparing the polymers. The products are thermoplastic solids which may be molded to obtain smooth surfaced articles of desired size and shape. They may also readily be milled, e. g. on calendering rolls, to obtain uniform sheets of desired thickness. They possess excellent dielectric properties and are well suited for use as electric insulating agents, e. g. as materials for coating and insulating electric wires, cables, radio parts, etc. They possess tensile strengths which are satisfactory for such purposes and they may be vulcanized with usual vulcanizing agents to effect a great increase, e. g. an increase of 50 per cent or more, in the tensile strength thereof. When in the form of thin sheets or ribbons, the unvulcanized products are quite flexible, even at temperatures of −50° C. or lower. Vulcanization usually renders the polymeric products nonthermoplastic and somewhat stiffer than before vulcanization. However, vulcanization does not render the products brittle or change greatly their ability to be flexed or bent, even at low temperatures. For instance, an unvulcanized product which becomes brittle at −70° C. may, after being vulcanized, become brittle at −65° C. or thereabout. Furthermore, the degree of flexibility of an unvulcanized, or a vulcanized, product does not change greatly over a wide range of temperatures, i. e. it does not change greatly until the temperature is lowered to a temperature range within which the product increases sharply in stiffness and becomes brittle, or until it is raised to the point at which the product becomes plastic or undergoes decomposition. In most instances, there is little change in the stiffness or flexibility of such product over the temperature range of from −50° C. to 80° C.

The angle through which a sheet of one-sixteenth inch thickness may be bent before breaking and also its stiffness or resistance to bending vary in regular manner with changes in the relative proportions of the diolefine and the vinyl aromatic compound used in preparing the same. Sheets of the products containing, in chemically combined form, 70 mole per cent or more of the diolefine, based on the combined amount of diolefine and vinyl aromatic compound used in preparing the same, are quite pliable and may in most instances be folded and creased without breaking. As the molecular proportion of the diolefine is decreased below the value just given, the products become more resistant to bending and the angle through which they may, at room temperature, be bent without breaking becomes less. However, even a sheet of such product containing only 37.5 mole per cent of the chemically combined diolefine may be bent repeatedly through a considerable angle, e. g. an angle of 15 degrees or more from its normal position, without breaking. Because of their properties, the products containing 70 mole per cent or more of the diolefine are particularly suitable for use as insulating coatings on wires which may be subjected to bending or vibration at sub-zero temperatures, and the products containing less than 70 mole per cent of the diolefine are adapted for use in making molded articles, e. g. cups, machine parts, or solid electric insulators, etc., which are quite stiff or rigid, but which even at low temperatures may be bent or distorted considerably without breaking.

We are aware that individual polymers of diolefines and vinyl aromatic compounds are well known, and that mechanical mixtures of such individual polymers and, also, copolymers of diolefines and vinyl aromatic compounds are known. However, each of such previously known products differs in one or more important respects from the present products and should not be confused with the latter. For instance, different polymeric products, composed of 40 per cent by weight styrene and 60 per cent butadiene, which (except for the order in which the styrene and butadiene, prior to or after being polymerized, are admixed) have been prepared under similar polymerizing conditions and using the catalyst required in practice of this invention, differ from one another in the following respects. The true copolymer prepared by polymerizing a mixture of styrene and butadiene is extremely tacky; is very easily stretched; does not produce a smooth surfaced article when compression molded; forms a sticky rubber-like sheet when rolled on a compounding mill; and, when in the form of such sheet, becomes rigid and brittle upon being cooled with solid carbon dioxide. In contrast, the corresponding mixed polymeric product of the present invention is relatively non-tacky; is elastic, but is far more resistant to stretching than the copolymer; and is readily molded to a smooth surfaced article, or milled to form a non-sticky sheet which remains flexible when cooled with solid carbon dioxide. Furthermore, under similar test conditions, the present product undergoes vulcanization more rapidly than does the corresponding copolymer. On the other hand, the extremely intimate mechanical mixture of polystyrene and polymerized butadiene (prepared by polymerizing the styrene and butadiene in separate aqueous emulsions, thereafter admixing the emulsions and coagulating the mixture of the polymers) when rolled on a compounding mill, forms a sheet which upon being cut, adheres tightly to a roll of the mill and cannot be removed therefrom without tearing it into small pieces. From these facts, it will be seen that the three products, although prepared from styrene and butadiene in the same relative proportions, are widely different.

The properties of the present products result not only from the kinds and proportions of the materials used in preparing the same, but to a large extent from the particular method by which they are made. In order to obtain such products it is important that the following method be adhered to.

The new polymeric products are prepared by alternately polymerizing, in the same aqueous emulsion, a conjugated aliphatic diolefine and either a monovinyl aromatic compound or a mixture of such compound together with a portion of the diolefine. The order in which the successive polymerization reactions are carried out is of secondary importance, but excellent results have most consistently been obtained by first polymerizing the diolefine.

It is important that the step of polymerizing the diolefine in the substantial absence of the monomeric vinyl aromatic compound be carried out in the presence of a particular complex catalyst consisting essentially of hydrogen peroxide, an iron salt of an inorganic acid, and an inorganic acid in amount sufficient to give the emulsion a pH value between 1.5 and 3. Attempts on our part to substitute other catalysts in place of such complex catalyst, or to omit one or more of the ingredients of the complex catalyst, have resulted in the formation of polymeric products which lacked one or more of the desirable properties of the present products. For instance, the substitution of a persulphate and an alkali, e. g. in amount sufficient to give a pH value of 8, in place of hydrogen peroxide and an acid, as the ingredients of the complex catalyst resulted in the formation of a product which, though capable of being vulcanized to a slight extent, was not greatly strengthened or rendered non-thermoplastic by vulcanization. Apparently, such substitutions reduced greatly the extent to which the product may be vulcanized.

The step of polymerizing the vinyl aromatic compound, or of copolymerizing it with a portion of the diolefine, is preferably also carried out in the presence of the complex catalyst. However, it may be accomplished without the aid of a catalyst or in the presence of catalysts other than the complex catalyst required in the step of polymerizing the diolefine. For instance, the emulsified vinyl aromatic compound may be polymerized under neutral, alkaline, or acidic conditions using hydrogen peroxide as the catalyst, or it may be polymerized while in an emulsion which contains the polymerized diolefine, an iron salt and the acid, but which is free of hydrogen peroxide.

In order to obtain a mixed polymeric product having the aforementioned combination of properties, it is important that the diolefine, in amount corresponding to at least 37.5 mole per cent of the total amount of diolefine and vinyl aromatic compound used in preparing such product, be polymerized in the substantial absence of the monomeric vinyl aromatic compound. The presence of a polymer or copolymer of the vinyl aromatic compound is not detrimental. Accordingly, the vinyl aromatic compound may be polymerized in emulsion before adding and polymerizing the diolefine. However, since the polymerized vinyl aromatic compound may sometimes retain a portion of the corresponding monomer, we preferably first polymerize the diolefine and thereafter add and polymerize the vinyl aromatic compound.

When the diolefine is used in amount exceeding 37.5 mole per cent of the polymerizable starting materials, all or part of such excess of the diolefine may, if desired, be copolymerized with the vinyl aromatic compound. Such copolymerization may precede or follow the step of polymerizing a portion of the diolefine in the substantial absence of the vinyl aromatic compound.

The proportions of the iron salt and the peroxide may be widely varied. Such salt in amount corresponding to only 0.2 part by weight of iron per million parts of the diolefine being polymerized has been found effective. Apparently, the iron salt, when used together with the other catalyst ingredients, not only increases the rate of the polymerization reaction, but decreases the molecular weight of the polymeric product which is formed. This latter effect is evidenced by the fact that in a series of comparative experiments, the polymerized diolefine, if isolated as such, varies from a solid to a viscous liquid with increase in the proportion of the iron salt employed in preparing the same. The employment of a large proportion of an iron salt, relative to the diolefine, is undesirable due to possible contamination of the polymeric product with a considerable amount of such salt. For these reasons, the iron salt is usually employed in amount such that its iron content corresponds to between 1 and 500 parts by weight of iron per million parts of the diolefine to be polymerized, but it may be used in even smaller or in larger proportions if desired. Examples of iron salts of inorganic acids which may be used as ingredients of the complex catalyst are ferric chloride, ferrous chloride, ferric bromide, ferrous bromide, ferric nitrate, ferric sulphate, etc. The iron salt need not be added as such, but may be formed in situ, e. g. by adding an oxide of iron and reacting it with a portion of the acid to form such salt.

The hydrogen peroxide must, of course, be used in amount sufficient to coact with the other catalyst ingredients to give the catalytic effect. A catalytic action is obtained when the proportion of hydrogen peroxide in an emulsified polymerization mixture corresponds to as little as 0.05 per cent of the weight of the material being polymerized. Usually, the catalytic action increases quite sharply with increase in the proportion of the peroxide to about 0.3 per cent of the weight of the compound subjected to polymerization and more gradually upon further increase in the proportion of the peroxide. Hydrogen peroxide sometimes is consumed during the polymerization reaction. Peculiarly, although the presence of the peroxide at the start of the reaction is necessary in order to obtain satisfactorily rapid reaction, removal or destruction of the peroxide during the polymerization does not result in appreciable reduction in the rate of polymerization. However, the aforementioned influence of the iron salt on the kind of polymer being formed (i. e. on the thickness, or the body, of the polymerized diolefine) is obtained to an appreciable extent only so long as the peroxide is present in the reaction mixture. The unusual combination of properties possessed by the ultimate mixed polymeric product is due, in part, to the kind of polymer obtained in the step of polymerizing the diolefine in the presence of the complex catalyst. For these reasons, the hydrogen peroxide is usually employed in amount corresponding to between 0.2 and 5, preferably between 0.3 and 2, per cent of the weight of the diolefine being polymerized. It may, if desired, be used in larger proportions. The hydrogen peroxide may be added as such or it may be formed in situ within the reaction mixture, e. g. by adding a metal peroxide such as sodium peroxide, potassium peroxide, or barium peroxide, etc., so as to form hydrogen peroxide by reaction with a portion of the acid.

In practice, a conjugated diolefine and a minor amount of the complex catalyst are added to an aqueous solution of an emulsifying agent and the mixture is agitated to effect emulsification. The order in which the several ingredients are admixed and also the percent by weight of diolefine in the emulsion may be varied and are without appreciable effect on the properties of the final polymeric product. Usually the diolefine is introduced under pressure into a bomb or autoclave containing the other ingredients so as to form an emulsion containing from 5 to 40 per cent by weight of the diolefine. A variety of emulsifying agents which may be used in forming such emulsions are well known. Examples of such emulsifying agents are Nopco (a sodium salt of sulphonated sperm oil), egg albumen, and alkali metal sulphonates of aliphatic hydrocarbons or alkyl-aromatic hydrocarbons of high molecular weight, etc. Nopco is readily available and highly satisfactory for the purpose and is usually employed. It is usually employed in amount corresponding to from 3 to 6 per cent of the combined weight of the diolefine and the vinyl aromatic compound to be used in preparing the ultimate polymeric product, but it may be used in smaller or larger proportions if desired.

The emulsion is heated under pressure and preferably with agitation at temperatures between 70° and 110° C. until the diolefine is largely polymerized. Substantially complete polymerization is desirable, but not necessary. The course of the polymerization reaction may be followed by observing the change in vapor pressure of the mixture during the reaction, i. e. as the polymerization continues the pressure becomes less. When operating at temperatures of 90° to 100° C., the catalytic polymerization may be completed in from 1 to 10 hours. At lower polymerization temperatures, somewhat longer periods of heating may be required.

After polymerizing the diolefine, a vinyl aromatic compound is added, the mixture is agitated to emulsify the same, and the vinyl aromatic compound is polymerized, usually at temperatures between 70° and 110° C. This polymerization reaction is preferably carried out in the substantial absence of air, e. g. at atmospheric pressure under an atmosphere of nitrogen or within a reactor which is closed to exclude air, but it may be carried out in contact with air to obtain a product of good quality provided care is taken to avoid extensive admixture of air with the emulsion. Usually, the vinyl aromatic compound is polymerized by heating the emulsion within a bomb or autoclave in a manner similar to that employed in polymerizing the diolefine. The polymerization of the vinyl aromatic compound occurs rapidly and may sometimes be completed in one-half hour or less. In most instances, the emulsion of said compound is heated for an hour or longer so as to assure completion of the reaction.

After completing the polymerizations, a small portion of any of the usual anti-oxidants for rubber, such as phenyl-beta-naphthylamine, di-(p-hydroxy-phenyl)-cyclohexane, Antox (a condensation product of aniline and butyraldehyde), or Thermoflex (i. e. p.p'-dimethoxy-diphenylamine), etc., is added, usually in amount corresponding to between 0.5 and 5 per cent of the weight of the diolefine employed in preparing the product. In some instances, the anti-oxidants may be added prior to, or during, either of the polymerization reactions, but often they tend to inhibit polymerizations. Accordingly, they are best added after completing the reactions.

The polymeric product is coagulated in any of the usual ways, e. g. by freezing the colloidal solution thereof, or by mixing it with any of a variety of coagulating agents such as an aqueous solution of hydrochloric or sulphuric acid, or an aqueous solution of a salt such as sodium chloride, sodium sulphate, or calcium chloride, etc. The coagulated product is removed from the mixture, washed with water to free it of adhering mother liquor, and dried. It is usually obtained in the form of a powder, or as small granules.

The product may be molded at elevated temperatures, e. g. between 110° and 200° C., into smooth surfaced articles of desired size and shape. It may also be milled on calendering rolls into the form of a sheet. The molded or milled articles are quite flexible and do not vary greatly in stiffness or flexibility over a wide range of temperatures. Instead, sheets of the products vary, with increase in the proportion of a vinyl aromatic compound chemically combined therein, from materials having a pliability similar to that of leather to materials which, though quite flexible, are stiff and springy at room temperature.

If desired, before molding or extruding the polymeric products, they may be compounded, e. g. on a mill, together with added materials such as dyes, pigments, fillers, plasticizing agents, or vulcanizing agents, etc. When thus treated with a vulcanizing agent, the products may be vulcanized during molding to increase their tensile strength and render them non-thermoplastic without greatly changing their ability to be bent or flexed even at low temperatures. Any of the usual rubber vulcanizing agents may be used for the purpose.

As procedures alternative to that just described, the vinyl aromatic compound may first be emulsified and polymerized after which the diolefine may be added and be polymerized, or the product may be prepared by a series of three or more reactions for the alternate polymerizations of the diolefine and the vinyl aromatic compound in the same aqueous emulsion. However, regardless of the order in which the successive polymerization reactions are carried out, it is important that they be accomplished in the same aqueous emulsion and that the aforementioned complex catalyst be present in the step of polymerizing the diolefine.

The following examples describe certain ways in which the principle of the invention has been applied, but are not to be construed as limiting the invention.

EXAMPLE 1

In each of a series of experiments, butadiene-1.3 was emulsified with water, polymerized while in the emulsion, and styrene was thereafter added and polymerized in the same emulsion. The relative proportions of butadiene and styrene were varied in different experiments, but in all except runs 3 and 3a of the following table, the combined amount of the two compounds corresponded to approximately 25 per cent of the final weight of the emulsion. Also, in all except runs 3 and 3a of the table, the emulsion contained ferric nitrate, $Fe(NO_3)_3 \cdot 9H_2O$, in amount such that its iron content correspond to 6 parts by weight of iron per million parts of the compounds to be polymerized. In runs 3 and 3a, which in reality amount to a single experiment, the combined weight of the butadiene and styrene corresponded to 21 per cent of the final weight of the emulsion and the ferric nitrate was present in amount containing 7.5 parts by weight of iron per million parts of the two polymerizable compounds. Experience has shown that these slight differences between the reaction conditions employed in the experiment described as runs 3 and 3a and those employed in the other experiments are not such as to change appreciably the properties of the final polymeric product. Accordingly, runs 3 and 3a are presented together with the other experiments for purpose of illustrating the effect of changes in the relative proportions of the polymerizable starting materials on the properties of the polymeric products. The procedure in carrying out an experiment was to introduce butadiene under pressure into an autoclave containing an aqueous solution of ferric nitrate in the amount just stated, hydrogen peroxide and Nopco (a sodium salt of sulphonated sperm oil) in amounts corresponding, respectively, to 1.05 and 4.0 per cent of the combined weight of the compounds to be polymerized, and nitric acid in amount such as to give the entire mixture a pH value of 2.0. When the desired amount of butadiene had been introduced, the autoclave was closed and agitated to emulsify the butadiene. The emulsion was heated, with continued agitation, at 90° C. for the time stated in the table. The autoclave was then cooled, opened, and the styrene added. It was again closed and heated at 90° C. with agitation for the time also given in the table. After completing the two polymerization reactions, the emulsion was treated first with the anti-oxidant, 4.4'-dimethoxy-diphenylamine, in amount corresponding to one per cent of the weight of the butadiene employed in preparing the product and then with an aqueous sodium chloride solution to cause coagulation of the polymeric product. The product was separated from the mixture, washed with water, and dried. A portion of the product was molded into standard-sized test pieces and the latter were employed in determining the tensile strength in pounds per square inch, the per cent elongation value (i. e. the per cent of its original length by which a strip of the material could be stretched before breakage occurred), the per cent of "set" (i. e. the per cent of its original length by which such strip was permanently lengthened after being stretched and then released), and the Shore durometer hardness of the product. Procedures for making such tests are well known, hence they need not be described in detail. Another portion of the product was compounded, on a compounding mill, with 40 per cent of its weight of carbon black of a quality known commercially as Gastex, 5 per cent of zinc oxide, 4 per cent of sulphur, 2 per cent of stearic acid, and 1 per cent of 2-mercapto-thiazoline. The resultant composition was rolled into a sheet and the latter was cured by heating the same in a press at a temperature of 140° C. for 30 minutes. Standard sized test strips were cut from the sheet and were used to determine the above-mentioned properties of the vulcanized product. Both before and after being compounded and cured the polymeric product was flexible at temperatures as low as −50° C. Table I gives the proportions of butadiene and of styrene used in making each product, as per cent of the combined weight of the two polymerizable compounds, and states the time over which the emulsion was heated at 90° C. in polymerizing each compound. It also gives the properties of each mixed polymeric product both prior to and after being compounded and cured. In the table the mixed polymeric products which have not been compounded and cured are referred to as "uncured" and those which have been compounded and cured are referred to as "cured."

Table I

| Run No. | Compounds Polymerized | | Polymerization Time for— | | Properties of Product | | | | |
|---|---|---|---|---|---|---|---|---|---|
| | Butadiene, Per Cent | Styrene, Per Cent | Butadiene, hrs. | Styrene, hrs. | Cured or Uncured | Tensile Strength, Lbs./Sq. In. | Per Cent Elongation | Per Cent Set | Hardness |
| 1 | 60 | 40 | 3.5 | 2.5 | Uncured | 740 | 260 | 18 | 80A |
| 1a | 60 | 40 | 3.5 | 2.5 | Cured | 2580 | 140 | 20 | 70C |
| 2 | 70 | 30 | 3.5 | 2.0 | Uncured | 480 | 240 | 10 | 64A |
| 2a | 70 | 30 | 3.5 | 2.0 | Cured | 2160 | 170 | 14 | 90A |
| 3 | 75 | 25 | 3.5 | 2.5 | Uncured | 220 | 210 | 2 | 54A |
| 3a | 75 | 25 | 3.5 | 2.5 | Cured | 1410 | 130 | 2 | 83A |
| 4 | 80 | 20 | 3.25 | 1.25 | Uncured | 140 | 150 | 2 | 48A |
| 4a | 80 | 20 | 3.25 | 1.25 | Cured | 985 | 150 | 2 | 80A |

EXAMPLE 2

In preparing a mixed polymeric product from 60 parts by weight of butadiene and 40 parts of styrene, the order in which the successive polymerizations were carried out was reversed from that shown in Example 1. The styrene was first polymerized while in an aqueous emulsion containing Nopco and hydrogen peroxide in the respective proportions stated in Example 1, ferric nitrate in amount such as to contain 6 parts by weight of iron per million parts of the two compounds to be polymerized, and nitric acid in amount sufficient to give the emulsion a pH value of 2. The styrene was polymerized by heating the emulsion with agitation in a closed container at a temperature of 90° C. for 2 hours. The butadiene was then added to the emulsion and was polymerized by heating with agitation in a closed reactor at a temperature of 70° C. for 13.5 hours. After polymerizing the diolefine, the emulsion contained approximately 25 per cent by weight of polymeric material. It was treated with 4.4'-dimethoxy-diphenylamine in the amount stated in Example 1. The polymerized product was separated from the emulsion, one portion was molded into test pieces for use in determining properties of the product, and another portion was compounded and rolled into a sheet which was cured, and test strips were cut from the sheet and used to determine properties of the cured product, as in Example 1. However, the time of heating the sheet of compounded material in a press at 140° C. to cure the same was, in this example, only 5 minutes. Both before and after being compounded and cured, the polymeric product was flexible and could be folded upon itself without breaking at temperatures as low as −50° C. Table II gives the mechanical properties of the product, both before and after compounding and curing the same.

Table II

| Condition of Product | Properties of Product | | | |
|---|---|---|---|---|
| | Tensile Strength, Lbs./Sq. In. | Percent Elongation | Percent Set | Hardness |
| Uncured | 920 | 110 | 14 | 66-C |
| Cured | 2,020 | 40 | 8 | 82-C |

EXAMPLE 3

This example illustrates the preparation of a polymeric product containing, in polymerized form, 62.5 per cent by weight of butadiene and 37.5 per cent of styrene by first copolymerizing the styrene with a portion of the butadiene while in an aqueous emulsion of the two compounds and thereafter adding the remainder of the butadiene and polymerizing it. An aqueous emulsion containing 75 parts by weight of styrene and 25 parts of butadiene dispersed in approximately 600 parts of an aqueous solution of Nopco, hydrogen peroxide, ferric nitrate and nitric acid in the proportions stated in Example 1 was heated with agitation in a closed container at a temperature of 90° C. for 45 minutes to copolymerize the styrene and butadiene. One hundred parts of butadiene was then introduced under pressure and the polymerization was continued with agitation at 90° C. for 1 hour 45 minutes. The emulsion was treated with 0.625 part of 4.4'-dimethoxy-diphenylamine after which polymeric product was separated and dried. One portion of the product was used directly in determining its properties. Another portion was compounded, cured, and its properties determined. The procedure in both instances was the same as described in Example 1. The product, both before and after being compounded and cured, was flexible at −50° C. Table III gives the mechanical properties of the uncured and of the compounded and cured product.

Table III

| Condition of Product | Properties of Product | | | |
|---|---|---|---|---|
| | Tensile Strength, Lbs./Sq. In. | Percent Elongation | Percent Set | Hardness |
| Uncured | 620 | 400 | 36 | 90-A |
| Cured | 2,200 | 150 | 40 | 76-C |

EXAMPLE 4

The procedure of Example 3 was repeated, except that the order in which the two polymerization reactions were carried out was reversed, i. e. 100 parts of emulsified butadiene was first polymerized, after which 100 parts of a mixture of 75 per cent styrene and 25 per cent butadiene was added and polymerized. The mechanical properties of the uncured product and of the product, after being compounded and cured, were determined as in the preceding examples. Compounding and curing of the product was accomplished as in Example 1. Both before and after being compounded and cured, the product was flexible at −50° C. Table IV gives the mechanical properties of the product both before and after curing the same.

Table IV

| Condition of Product | Properties of Product | | | |
|---|---|---|---|---|
| | Tensile Strength, Lbs./Sq. In. | Percent Elongation | Percent Set | Hardness |
| Uncured | 220 | 260 | 2 | 48-A |
| Cured | 980 | 120 | 2 | 82-A |

EXAMPLE 5

This example illustrates the preparation of a polymeric product, composed of 60 per cent by weight butadiene and 40 per cent styrene, by carrying out three successive polymerizations in the same aqueous medium. Twenty parts by weight of styrene was added to approximately 300 parts of an aqueous solution containing 4 parts of Nopco (a sodium salt of sulphonated sperm oil), 1.05 part of hydrogen peroxide, ferric nitrate in amount containing 0.092 part by weight of iron per million parts of the styrene, and sufficient nitric acid to give the mixture a pH value of 2. The mixture was agitated to effect emulsification after which the styrene was polymerized by heating the emulsion in a closed container at 90° C. for 1 hour. Sixty parts of butadiene and ferric nitrate in amount containing 3.08 parts of iron per million parts of the butadiene, were added, the butadiene of course being introduced under pressure. Heating of the emulsion at 90° C. with agitation was continued for 3 hours. The reactor was then opened and another 20 parts by weight of styrene was added. The reactor was again closed and the mixture was heated with agitation at 90° C. for 2.5 hours. Thereafter, the reactor was discharged, 0.6 part of 4.4'-dimethoxy-diphenylamine was added, and the polymeric product was coagulated, separated from the mixture and dried. One portion of the product was molded into test pieces and another portion was compounded, cured, and cut into test pieces. The mechanical properties of the uncured and the cured test pieces were determined, as in Example 1. Both before and after being compounded and cured, the product was flexible at temperatures as low as −50° C. Table V gives the mechanical properties of the product, both before and after being compounded and cured.

Table V

| Condition of Product | Properties of Product | | | |
|---|---|---|---|---|
| | Tensile Strength, Lbs./Sq. In. | Percent Elongation | Percent Set | Hardness |
| Uncured | 1,000 | 230 | 20 | 90-A |
| Cured | 2,780 | 100 | 20 | 98-A |

EXAMPLE 6

The purpose of this example is to compare a mixed polymeric product of this invention and a corresponding true copolymer of butadiene and styrene as regards the tendency of the two materials to stiffen and become brittle upon lowering the temperature. It may be mentioned that the rate at which each material stiffens per degree lowering of the temperature increases rapidly after it has been cooled beyond a point characteristic of the material. In general, after cooling two such materials to the points at which the rates of increase in stiffness per degree lowering of the temperature are accelerated, the material undergoing the least such acceleration will undergo more extensive further cooling before becoming brittle than the one undergoing the greatest acceleration of its rate of stiffening. Thus the increasing rates of stiffening with lowering of the temperature are a measure of the relative tendencies of the two materials to become brittle. True brittle points are not given, since they cannot be determined with accuracy and are not readily duplicated. One of the materials tested was an uncured copolymer of 60 per cent butadiene and 40 per cent styrene. It was prepared by adding 60 parts by weight of butadiene and 40 parts of styrene to 300 parts of an aqueous solution containing 4 parts of Nopco, 1.05 parts of hydrogen peroxide, ferric nitrate in amount containing 6 parts of iron per million parts of the butadiene and styrene, and nitric acid in amount sufficient to give the mixture a pH value of 2. The mixture was agitated in a closed container to effect emulsification and was heated with continued agitation at 90° C. for 2.25 hours. The container was then cooled and 0.6 part of 4.4′-dimethoxy-diphenylamine was added to the emulsion. The polymeric product was coagulated, separated, dried and molded into test pieces. The other material tested was the uncured mixed polymeric product described in Run 1 of Example 1. The method of testing was to support a rectangular bar of a polymeric material on two transverse knife edges spaced two inches apart, cool to a temperature of from 5° to 10° C. below that at which a reading is to be taken, and at a mid-point between the supporting knives apply a downward load on the test bar until, at its center, the bar was bent 0.033 inch downward below the level of the supporting knife edges. The temperature and applied load at which this degree of bending occurred were determined. The test was repeated with change in the temperature and the load applied to cause the same degree of bending at the second temperature was determined. In this way a number of load vs. temperature values were determined for each material. Since the width and thickness of the test bars varied slightly in different tests, the modulus, i. e. the loads in pounds per square inch of cross-section required to cause bending of the test bars, were calculated in accordance with the following formula:

$$\text{Modulus} = \frac{\text{actual load }(0.06)}{A^3 B}$$

where A is the thickness in inches of the bar actually used and B is its width in inches. Table VI identifies each product and gives its modulus at each temperature mentioned.

Table VI

| Temperature, °C. | Modulus of— | |
|---|---|---|
| | Co-Polymer | Mixed Polymeric Product |
| 10 | Too low for measurement | 3.175×10⁴ |
| 0 | do | 3.964×10⁴ |
| −10 | 0.265×10⁴ | 4.234×10⁴ |
| −20 | Not tested | 4.895×10⁴ |
| −21 | 1.323×10⁴ | Not tested |
| −30 | Not tested | 5.821×10⁴ |
| −31 | 13.892×10⁴ | Not tested |
| −33 | 27.122×10⁴ | Not tested |
| −40 | Too brittle for testing | 7.144×10⁴ |
| −50 | do | 9.129×10⁴ |
| −60 | do | 14.156×10⁴ |
| −67 | do | 21.697×10⁴ |

EXAMPLE 7

Two different polymeric products, each composed of 70 per cent by weight butadiene and 30 per cent styrene, were prepared and tested as follows: A true copolymer of styrene and butadiene was prepared by adding 70 parts by weight of butadiene and 30 parts of styrene to 300 parts of an aqueous solution containing 4 parts of Nopco, 1.05 part of hydrogen peroxide, ferric nitrate in amount containing 6 parts by weight of iron per million parts of the butadiene and styrene, and nitric acid in amount sufficient to give the mixture a pH value of 2. The mixture was heated with agitation in a closed container at 90° C. for 2 hours 40 minutes, after which the container was cooled, opened, 0.7 part of 4.4′-dimethoxy-diphenylamine was added, and the reaction mixture was treated with sodium chloride to coagulate the product. A mixed polymeric product was prepared by introducing 70 parts by weight of butadiene into an autoclave containing 300 parts of an aqueous solution of 4 parts of Nopco, 1.05 parts of hydrogen peroxide, ferric nitrate in amount containing 8.6 parts of iron per million parts of the butadiene, and sufficient nitric acid to give the mixture a pH value of 2. The autoclave was closed and the mixture was heated with agitation at 90° C. for 3 hours to polymerize the butadiene. 30 parts by weight of styrene was then added and heating with agitation at 90° C. was continued for another 2 hours. The autoclave was then opened, 0.7 part of 4.4′-dimethoxy-diphenylamine was added, and the mixture was treated with sodium chloride to coagulate the product. Each product was dried. A portion of each product was molded into test pieces which were used to determine the tensile strength in pounds per square inch, the per cent elongation value, the per cent permanent set value, and the Shore durometer hardness, as described in Example 1. Each product was also tested to determine whether it was brittle at extremely low temperatures. The procedure in this test was to lay a test bar of the material across knife edges spaced 2 inches apart, cool the material to the temperature at which the test is to be made, place an equally cold instrument having a dull point e. g. a dull chisel, on the test bar at the mid-point between the supporting knife edges, and quickly thrust the dulled instrument downward a distance of 0.75 inch so as to cause bending of the test bar. If the bar broke when thus bent, it was considered brittle. If it did not break, it was considered non-brittle. The test bars used were of 0.25 inch width and 0.1 inch thickness. Another portion of each product was compounded, rolled or molded into a sheet, cured, and test pieces were cut from the cured sheet as described in Example 1. These test pieces were used to determine properties of the compounded and cured product corresponding to those determined for the uncured product. Table VII lists the properties determined for each of the products, both before and after compounding and curing the products.

*Table VII*

| Material Tested | Tensile Strength, Lbs./Sq. In. | Properties | | | | | |
|---|---|---|---|---|---|---|---|
| | | Per Cent Elongation | Per Cent Set | Hardness | Brittle at: ° C. | | |
| | | | | | −50 | −60 | −70 |
| Uncured copolymer | Too weak for testing | 650 | 0 | 25–A | Yes | Yes | Yes |
| Uncured mixed polymeric product | 370 | 190 | 6 | 60–A | No | No | No |
| Cured copolymer | 1,200 | 200 | 2 | 66–A | Yes | Yes | Yes |
| Cured mixed polymer product | 2,210 | 120 | 10 | 94–A | No | No | No |

EXAMPLE 8

Three different products, each composed of 70 per cent butadiene and 30 per cent styrene; viz. (1) a mechanical mixture of polystyrene and polymerized butadiene prepared in separate emulsions which after completing the polymerizations were admixed and the two polymers were coagulated together, (2) a copolymer of styrene and butadiene, and (3) a mixed polymer of this invention prepared by successively polymerizing butadiene and styrene in the same aqueous emulsion; were compared as to their behavior upon milling the same on compounding rolls into the form of a sheet and as to the properties of such sheets when obtained. The polymerization reactions to form the three products were carried out in aqueous emulsions containing as a catalyst, a mixture of hydrogen peroxide, ferric nitrate and sufficient nitric acid to give each emulsion a pH value of 2. The procedures in preparing the products and stabilizing them with 4.4′-dimethoxy-diphenylamine were similar to those set forth in Example 7. Prior to milling the same, each product was, of course, separated from the emulsion, washed with water, and dried. Product (1) was worked on a pair of unheated compounding rolls having different speeds of rotation until it formed a thin uniform sheet over the surface of one of the rolls. The sheet was cut lengthwise on the roll and attempt was made to strip it from the roll. However, it adhered so tightly that it could not be pulled from the roll without tearing it to bits. Product (2), i. e. the copolymer, was similarly milled and the resultant sheet, after being cut, was pulled without difficulty from the roll. However, the sheet was extremely sticky and of very low tensile strength. When folded, the plies thereof stuck together. Product (3), i. e. the product prepared in accordance with this invention, was similarly milled. It formed a uniform sheet of good appearance which, after being cut, was readily pulled from the roll. The sheet was not sticky, was quite strong and was very pliable.

EXAMPLE 9

The purpose of this example is to compare the copolymer of 75 per cent by weight styrene and 25 per cent butadiene with the corresponding mixed polymer prepared by the method of this invention. The copolymer was prepared by introducing 75 parts by weight of styrene and 25 parts of butadiene into an autoclave containing 300 parts of an aqueous solution of 4 parts of Nopco, 1.05 parts of hydrogen peroxide, ferric nitrate in amount containing 6 parts by weight of iron per million parts of the styrene and butadiene, and nitric acid in amount sufficient to give the mixture a pH value of 2. The autoclave was closed and the mixture was heated with agitation at 90° C. for 2 hours. Thereafter the autoclave was cooled, opened, and 0.25 part of 4.4′-dimethoxy-diphenylamine was added. The copolymer product was separated, washed, and dried as described in Example 1. The mixed polymeric product was prepared from similar starting materials, but in this instance the butadiene was first added to the acidic aqueous solution of the catalyst and Nopco, and was polymerized by heating the mixture with agitation at 90° C. for 5 hours. The styrene was then added and heating with agitation at 90° C. was continued for 2 hours. The autoclave was then cooled, opened, 0.25 part of 4.4′-dimethoxy-diphenylamine was added, and the polymeric product was coagulated, separated from the liquor, washed with water, and dried. Each product was molded into a panel of about one-sixteenth inch thickness. The copolymer formed a pliable rough surfaced panel of poor appearance, but the mixed polymer formed a relatively stiff, but flexible, smooth surfaced panel of excellent appearance. Both panels were very flexible at room temperature and the panel of the mixed polymer remained flexible when cooled to −78° C. However, the panel of the coplymer became rigid and brittle when cooled to 0° C.

Other vulcanizable polymeric products which both before and after being vulcanized are flexible at low temperatures may be prepared by alternately polymerizing other conjugated aliphatic diolefines and/or monovinyl aromatic compounds in the same aqueous medium as hereinbefore described, of course, that the compound to be polymerized is emulsifiable in the medium and that the diolefine is polymerized in the presence of the aforementioned complex catalyst. Thus, in place of the styrene employed in the foregoing specific examples, other monovinyl aromatic compounds such as orthochlorostyrene, metachlorostyrene, parachlorostyrene, paramethylstyrene, ortho-ethylstyrene, paraisopropylstyrene may be substituted and in place of the butadiene-1.3 employed in said examples other conjugated diolefines such as isoprene or 2.3-dimethyl-butadiene-1.3 may be used. Furthermore, instead of using a single monovinyl aromatic compound or a single conjugated aliphatic diolefine as a reactant in preparing the products, e. g. a mixture of vinyl aromatic compounds, e. g. a mixture of styrene and parachlorostyrene or a mixture of conjugated diolefines such as butadiene and isoprene may be used.

Other modes of applying the principle of the invention may be employed instead of those explained, change being made as regards the method or products herein disclosed, provided the steps or compounds stated by any of the following claims, or the equivalent of such stated steps or compounds, be employed.

We therefore particularly point out and distinctly claim as our invention:

1. The method which comprises alternately emulsifying with water and polymerizing while in the emulsion a monovinyl aromatic compound of the benzene series having the vinyl radical attached to a carbon atom of the benzene nucleus, and a conjugated aliphatic diolefine, which diolefine is in amount corresponding to between 37.5 and 94.5 mole per cent of the total amount of the polymerizable compounds, the alternate polymerizations being carried out in such manner that, after the first polymerization reaction, material next to be polymerized is added to and emulsified with the aqueous colloidal solution of the polymer first formed and is polymerized while in the emulsion and so that in each such successive polymerization reaction a polymer is formed in the presence of an aqueous colloidal solution of polymeric material previously formed, and, in one such polymerization reaction, polymerizing, in the absence of the monomeric monovinyl aromatic compound, an amount of the diolefine corresponding to at least 37.5 mole per cent of both polymerizable starting materials while the emulsion of the same contains hydrogen peroxide in amount corresponding to at least 0.05 per cent by weight of the diolefine, a ferric salt of an inorganic acid in an amount containing between 0.2 and 500 parts by weight of iron per million parts of the diolefine, and an inorganic acid in amount sufficient to give the emulsion a pH value between 1.5 and 3.

2. The method, as described in claim 1, wherein each polymerization is carried out at temperatures between 70° and 110° C.

3. The method, as described in claim 1, wherein the diolefine is first polymerized in the absence of the vinyl aromatic compound and in the presence of hydrogen peroxide in amount corresponding to between 0.2 and 5 per cent of the weight of the diolefine, a ferric salt of an inorganic acid in amount such as to contain between 1 and 500 parts by weight of iron per million parts of the diolefine and sufficient inorganic acid to give the emulsion a pH value between 1.5 and 3.

4. The method as described in claim 1, wherein the diolefine, in amount corresponding to at least 37.5 mole per cent of the polymerizable compounds, is first polymerized at temperatures between 70° and 110° C. in the absence of the vinyl aromatic compound and in the presence of hydrogen peroxide in amount corresponding to between 0.3 and 2 per cent of the weight of the diolefine, a ferric salt of an inorganic acid in amount such as to contain between 1 and 500 parts by weight of iron per million parts of the diolefine and sufficient inorganic acid to give the emulsion a pH value between 1.5 and 3.

5. The method, as described in claim 1, wherein the vinyl aromatic compound is polymerized in the first of the polymerization reactions.

6. The method, as described in claim 1, wherein the vinyl aromatic compound is polymerized at temperatures between 70° and 110° C. in the first of the polymerization reactions and the diolefine is subsequently added to the emulsion in amount corresponding to at least 37.5 mole per cent of the polymerizable starting materials and is polymerized while in the emulsion at temperatures between 70° and 110° C. in the presence of hydrogen peroxide in amount corresponding to between 0.2 and 5 per cent of the weight of the diolefine, a ferric salt of an inorganic acid in amount such as to contain between 1 and 500 parts by weight of iron per million parts of the diolefine and an inorganic acid in amount sufficient to give the emulsion a pH value between 1.5 and 3.

7. The method, as described in claim 1, wherein the vinyl aromatic compound is, in one of the successive polymerization reactions, copolymerized with a portion of the diolefine and, in another of the polymerization reactions, the diolefine, in amount corresponding to at least 37.5 mole per cent of the polymerizable starting materials, is polymerized at temperatures between 70° and 110° C. in the absence of the monomeric vinyl aromatic compound and in the presence of hydrogen peroxide in amount corresponding to between 0.3 and 2 per cent of the weight of the diolefine, a ferric salt of an inorganic acid in amount such as to contain between 1 and 500 parts by weight of iron per million parts of the diolefine and sufficient inorganic acid to give the emulsion a pH value between 1.5 and 3.

8. The method which comprises alternately emulsifying with water and polymerizing while in the emulsion styrene and butadiene-1.3, which butadiene-1,3 is in amount corresponding to between 37.5 and 94.5 mole per cent of the total amount of the styrene and butadiene-1.3, the alternate polymerizations being carried out in such manner that after the first polymerization reaction, material next to be polymerized is added to and emulsified with the aqueous colloidal solution of the polymer first formed and is polymerized while in the emulsion and so that in each such successive polymerization reaction a polymer is formed in the presence of an aqueous colloidal solution of polymeric material previously formed, and in one such polymerization reaction polymerizing, in the absence of monomeric styrene, butadiene-1.3 in amount corresponding to at least 37.5 mole per cent of the total amount of the styrene and butadiene starting materials while the emulsion of the butadiene-1.3 contains hydrogen peroxide in amount corresponding to between 0.2 and 5 per cent of the weight of the diolefine, a ferric salt of an inorganic acid in amount such as to contain between 1 to 500 parts by weight of iron per million parts of the diolefine, and an inorganic acid in amount sufficient to give the emulsion a pH value between 1.5 and 3.

9. The method as described in claim 8, wherein each polymerization is carried out at temperatures between 70° and 110° C.

10. The method as described in claim 8, wherein the butadiene-1.3 is first polymerized in the absence of monomeric styrene and in the presence of hydrogen peroxide in amount corresponding to between 0.3 and 2 per cent of the weight of the diolefine, a ferric salt of an inorganic acid in amount such as to contain between 1 and 500 parts by weight of iron per million parts of the diolefine, and sufficient inorganic acid to give the emulsion a pH value between 1.5 and 3.

11. The method as described in claim 8, wherein the butadiene-1.3, in amount corresponding to at least 37.5 mole per cent of the polymerizable starting materials, is first polymerized at temperatures between 70° and 110° C. in the absence of monomeric styrene and in the presence of hydrogen peroxide in amount corresponding to between 0.3 and 2 per cent of the weight of the diolefine, a ferric salt of an inorganic acid in amount such as to contain between 1 and 500 parts by weight of iron per million parts of the diolefine and sufficient inorganic acid to give the emulsion a pH value between 1.5 and 3.

12. The method as described in claim 8, wherein the styrene is polymerized in the first of the polymerization reactions.

13. The method as described in claim 8, wherein the styrene is polymerized at temperatures between 70° and 110° C. in the first of the polymerization reactions and the butadiene-1.3 is subsequently added in amount corresponding to at least 37.5 mole per cent of the polymerizable starting materials and is polymerized, while in the emulsion, at temperatures between 70° and 110° C. in the presence of hydrogen peroxide in amount corresponding to between 0.3 and 2 per cent of the weight of the diolefine, a ferric salt of an inorganic acid in amount such as to contain between 1 and 500 parts by weight of iron per million parts of the diolefine, and an inorganic acid in amount sufficient to give the emulsion a pH value between 1.5 and 3.

14. The method as described in claim 8, wherein the styrene is, in one of the successive polymerization reactions, copolymerized with a portion of the butadiene and in another of the polymerization reactions the butadiene-1.3, in amount corresponding to at least 37.5 mole per cent of the polymerizable starting materials, is polymerized at temperatures between 70° and 110° C. in the absence of monomeric styrene and in the presence of hydrogen peroxide in amount corresponding to between 0.3 and 2 per cent of the weight of the diolefine, a ferric salt of an inorganic acid in amount such as to contain between 1 and 500 parts by weight of iron per million parts of the diolefine, and an inorganic acid in amount sufficient to give the emulsion a pH value between 1.5 and 3.

15. A vulcanizable polymeric material composed of a monovinyl aromatic compound of the benzene series having the vinyl radical attached to a carbon atom of the benzene nucleus, and a conjugated aliphatic diolefine, each in chemically combined form, the diolefine being in amount corresponding to between 37.5 and 94.5 mole per cent of the total amount of the diolefine and vinyl aromatic compound of which said product is composed, the polymeric product being one which is prepared by alternately emulsifying with water and polymerizing the monovinyl aromatic compound and the conjugated aliphatic diolefine, the compound last to be polymerized being added to the aqueous colloidal solution of the polymer formed in the preceding polymerization reaction, and in one such polymerization reaction the diolefine in amount corresponding to at least 37.5 mole per cent of the polymerizable starting materials being polymerized in the absence of the monomeric vinyl aromatic compound and in the presence of hydrogen peroxide in amount corresponding to between 0.2 and 5 per cent of the weight of the diolefine, a ferric salt of an inorganic acid in amount such as to contain between 1 and 500 parts by weight of iron per million parts of the diolefine, and an inorganic acid in amount sufficient to give the emulsion a pH value between 1.5 and 3.

16. A vulcanizable polymeric product, as described in claim 15, which product is composed of styrene and butadiene-1.3 and when in the form of a thin sheet is pliable at temperatures as low as −50° C.

17. The polymeric product described in claim 15, when vulcanized.

18. A polymeric product, as described in claim 15, which is composed of chemically combined styrene and butadiene-1.3 and is vulcanized.

WALTER J. LE FEVRE.
KENNETH G. HARDING.

REFERENCES CITED

The following references are of record in the file of this patent:

UNITED STATES PATENTS

| Number | Name | Date |
|---|---|---|
| 1,938,730 | Tschunkur | Dec. 12, 1933 |
| 2,317,858 | Soday | Apr. 27, 1943 |
| 2,333,633 | Britton | Nov. 9, 1943 |
| 2,344,785 | Owens | Mar. 21, 1944 |
| 2,366,328 | Fryling | Jan. 12, 1945 |
| 2,380,473 | Stewart | July 31, 1945 |
| 2,388,685 | Guss | Nov. 13, 1945 |